No. 675,407. Patented June 4, 1901.
G. PELTZER.
APPARATUS FOR EXTRACTING FAT FROM WOOL.
(Application filed Dec. 26, 1900.)
(No Model.)
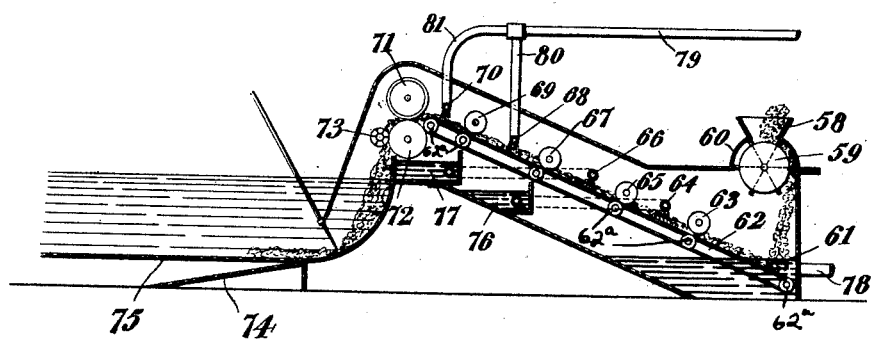

UNITED STATES PATENT OFFICE.

GEORGES PELTZER, OF VERVIERS, BELGIUM.

APPARATUS FOR EXTRACTING FAT FROM WOOL.

SPECIFICATION forming part of Letters Patent No. 675,407, dated June 4, 1901.

Application filed December 26, 1900. Serial No. 41,150. (No model.)

*To all whom it may concern:*

Be it known that I, GEORGES PELTZER, a citizen of Belgium, residing at Rue David, Verviers, in the Kingdom of Belgium, have invented a certain new and useful Apparatus for Extracting Fat from Wool by Means of Carbon Tetrachlorid, (for which patents have been applied for in Belgium, dated February 2, 1900, No. 147,678, and March 26, 1900, No. 148,782, and in Great Britain, dated February 6, 1900, No. 2,360,) of which the following is a specification.

This invention, which was originally included in my application, Serial No. 28,448, filed on August 29, 1900, relates to apparatus for extracting fatty matters from wool by the solvent action of carbon tetrachlorid, which is showered on the wool as it is carried upward along an incline, as I shall describe, referring to the accompanying drawing, which is a diagrammatic longitudinal section of apparatus according to my invention.

The wool, from which in the first instance have been removed the salts soluble in water and earthy matters, is introduced by the funnel 58 into the trough-roller 59, the partitions of which terminate in flexible strips, forming a tight joint against a casing 60, and falls directly into the tetrachlorid at 61. An endless traveling apron 62, carried by rollers 62ª, then carries it under a pressing-roller 63, then successively under a shower 64 of tetrachlorid, under another pressing-roller 65, under a second shower of tetrachlorid 66, and so on under two other compressing-rollers 67 and 69 successively, with two other showers of tetrachlorid 68 and 70, arranged alternately with said rollers 67 and 69, then through a pair of squeezing-rollers 71 and 72, and by a fluted roller 73 the wool is sent into the water of a washing-machine the bottom 74 of which, under a perforated false bottom 75, is sloped, so as to collect the tetrachlorid, which separates from the wool in presence of water.

The shower 64 is fed with tetrachlorid from the shower 68, having passed through a layer of the wool between the rollers 67 and 69 and collected in the reservoir 76, and the shower 66 is fed with tetrachlorid from the reservoir 77 after having passed through the wool between the rollers 71 and 72. The showers 68 and 70 are fed with pure tetrachlorid. The tetrachlorid charged with fat in the apparatus for removing the fat is discharged at 78 and led to distilling apparatus and after distillation is led back by the pipes 79, 80, and 81 to supply the showers 68 and 70. The wool after having the fat extracted from it, instead of being passed through water to separate such tetrachlorid as may still be carried by it, might be passed through a current of hot air or steam to have the tetrachlorid evaporated from it, the current charged with the tetrachlorid-vapor being afterward passed through cold water, in which the tetrachlorid is condensed and precipitated.

Having thus described the nature of this invention and the best means I know for carrying the same into practical effect, I claim—

In an apparatus for extracting fat from wool by means of carbon tetrachlorid, a closed chamber having a feeding device and a tank for tetrachlorid at one end, a traveling apron inclining upward from said tank in a straight line with means for supporting the same, pressure-rollers above said apron, supply-nozzles for delivering showers of carbon tetrachlorid on the passing wool between said rollers and a washing apparatus into which the treated wool is discharged, substantially as described.

In testimony whereof I have hereunto set my hand in presence of two subscribing witnesses.

GEORGES PELTZER.

Witnesses:
J. T. LE COST,
J. DEROUAER.